A. H. SEARLE.
Scythe.
RX No. 56.
Reissued Oct. 12, 1843.
8546X RELATED DOC
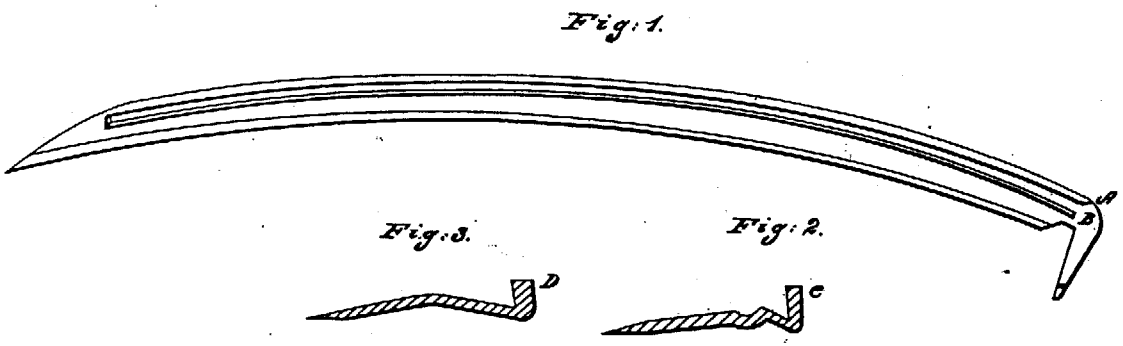
Witnesses:
Ebenezer Emery
Patrick Ward.
Inventor:
Cyrus Thurston Adm.

UNITED STATES PATENT OFFICE.

RX56

CYRUS THURSTON, OF FITCHBURG, MASSACHUSETTS, ADMINISTRATOR OF AUGUSTUS H. SEARLE.

IMPROVEMENT IN THE MANNER OR ART OF MANUFACTURING SCYTHES.

8546 RELATED DOC

Specification forming part of Letters Patent dated December 17, 1834; Reissue No. 56, dated October 12, 1843.

*To all whom it may concern:*

Be it known that AUGUSTUS H. SEARLE, late of Chelmsford, in the county of Middlesex and State of Massachusetts, now deceased, in the year 1834, or shortly before that time, invented and brought into use an improvement in the form and construction of scythes by raising and giving them a second back, for which improvement said SEARLE obtained Letters Patent dated the 17th day of December, 1834, and while in full life, which Letters Patent are deemed defective by reason of defects and mistakes found in the specification annexed to and making part of said Letters Patent, and to correct which mistakes and remedy said defects this new and amended specification has been made by me, CYRUS THURSTON, the administrator on said AUGUSTUS H. SEARLE'S estate, upon which, and the surrender of the aforesaid Letters Patent granted to said SEARLE, new Letters Patent may be obtained for the benefit of all concerned.

The invention and improvement for which said Letters Patent were granted, and which was intended to have been fully and correctly described and claimed, consists in raising a ridge or second back on the upper surface of the web or plate of the scythe near to and parallel with the first back, and running from the heel to the commencement of the point of the scythe, with a like ridge on the under side of the scythe, formed by the crease or indentation on the upper side made by the dies when giving form to this improvement. (See the drawings hereto annexed, marked and lettered.)

The mode used by said SEARLE for forming said second back and making said improvement consisted in the used of said dies so placed in hammers moved by hand or any other power as to make the proper lines and indentations, so as to raise and form said second back in the common method known to artists for giving form and shape to any metal to which they are applied.

It is not intended to claim as any part of this invention or improvement made by said SEARLE the method of constructing or making this second back to a scythe; but it was intended to claim, and the patentee now claims, the formation of the above second back upon a scythe as his invention and improvement, whereby a scythe is made with less stock and cheaper and much stiffer, and is much less likely to spring and get out of shape, and is much easier kept sharp and fit for use and in good order.

August 7, 1843.

CYRUS THURSTON,
*Administrator of the estate of Augustus H. Searle, deceased.*

In presence of—
NATHL. WOOD,
GEO. S. MESSINGER.